Jan. 15, 1946.  F. T. RABENS ET AL  2,393,059
BOTTLED DRINK DISPENSER
Filed April 9, 1943  6 Sheets-Sheet 1
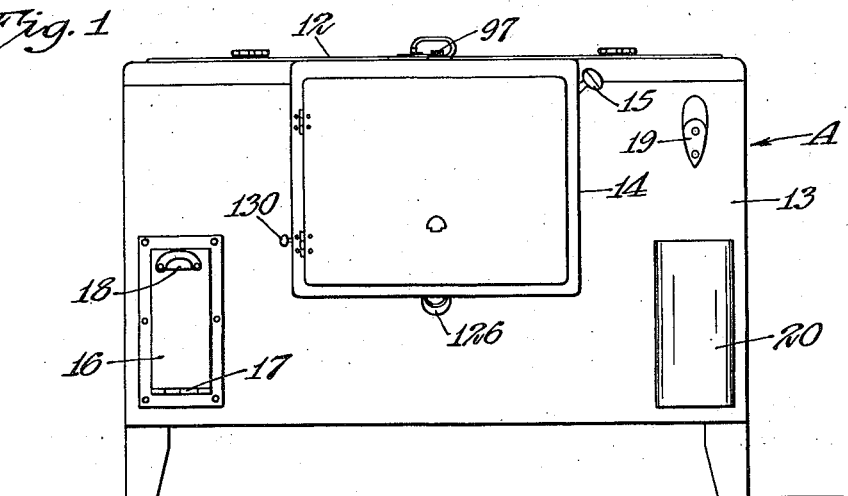
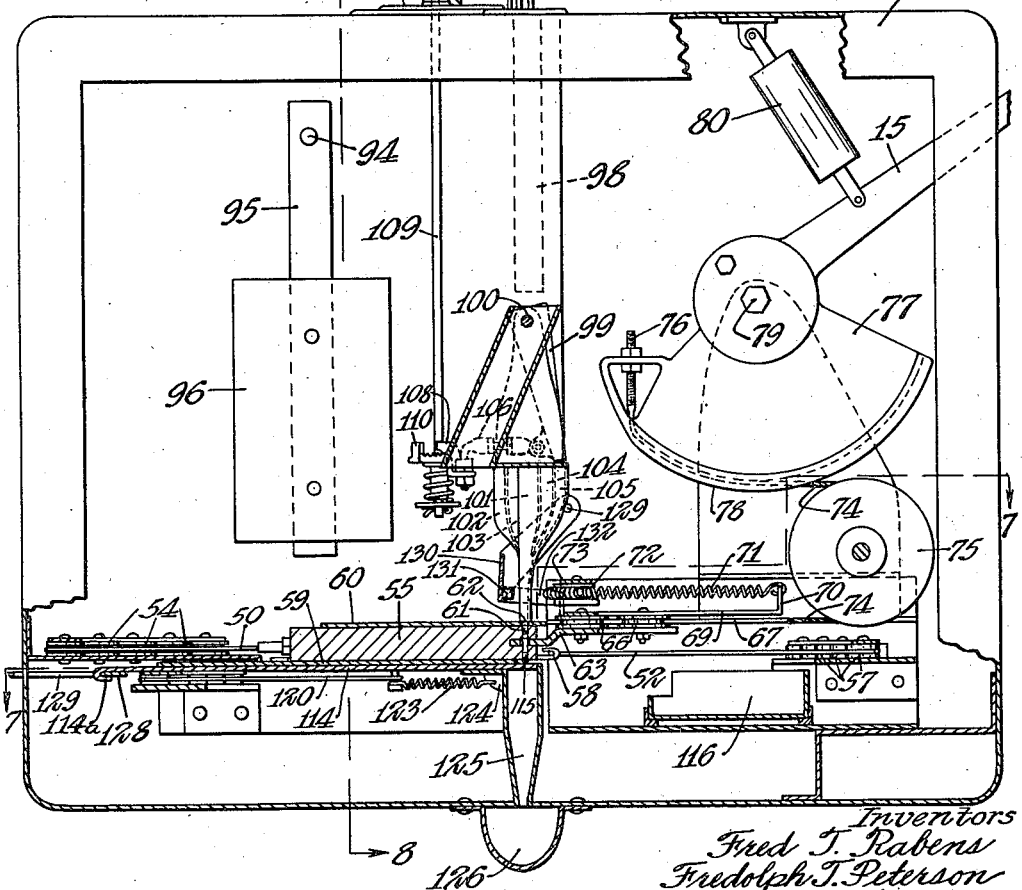
Inventors
Fred T. Rabens
Fredolph T. Peterson
By Williamson & Williamson
Attorneys

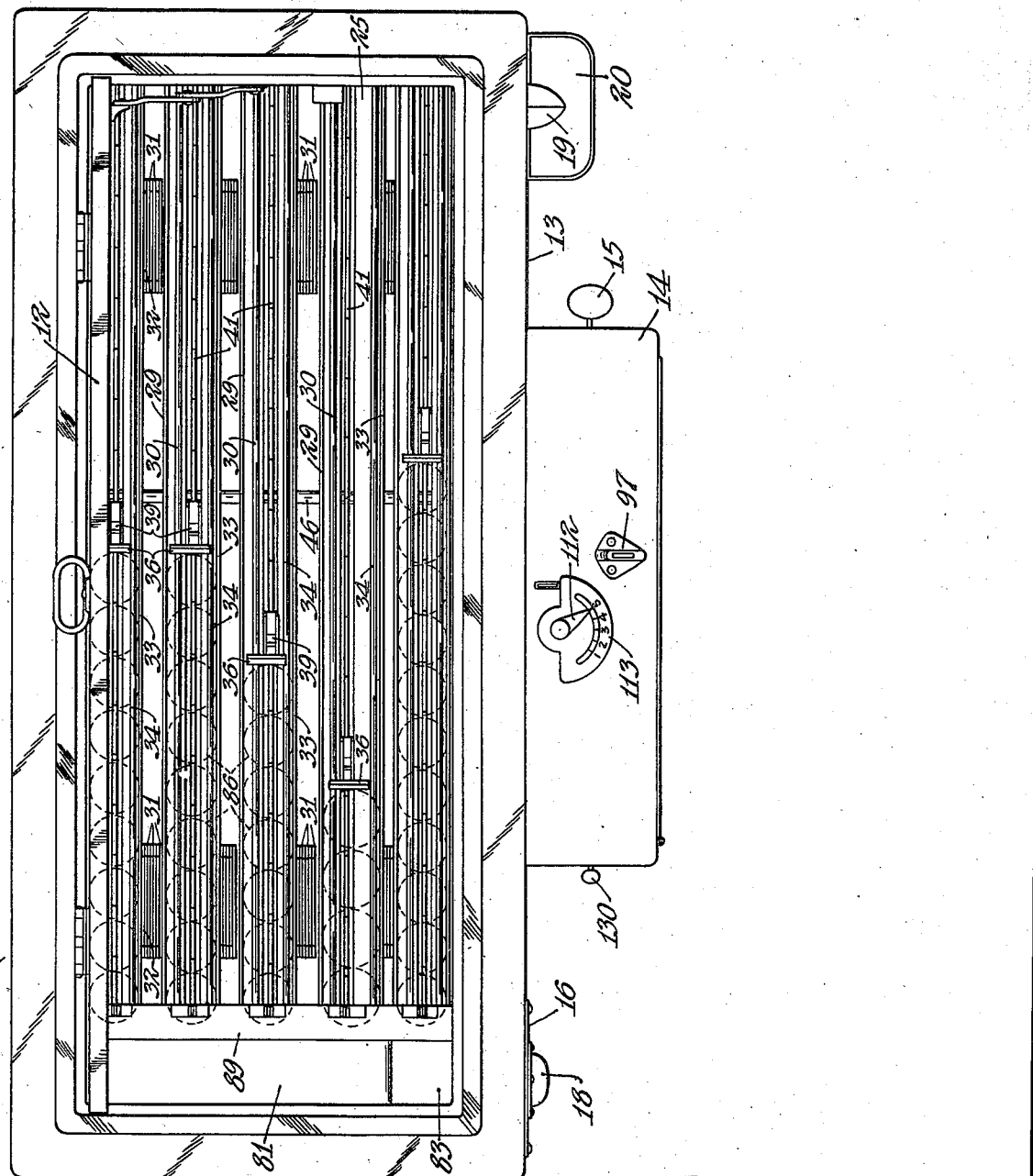

Jan. 15, 1946.  F. T. RABENS ET AL  2,393,059
BOTTLED DRINK DISPENSER
Filed April 9, 1943  6 Sheets-Sheet 3
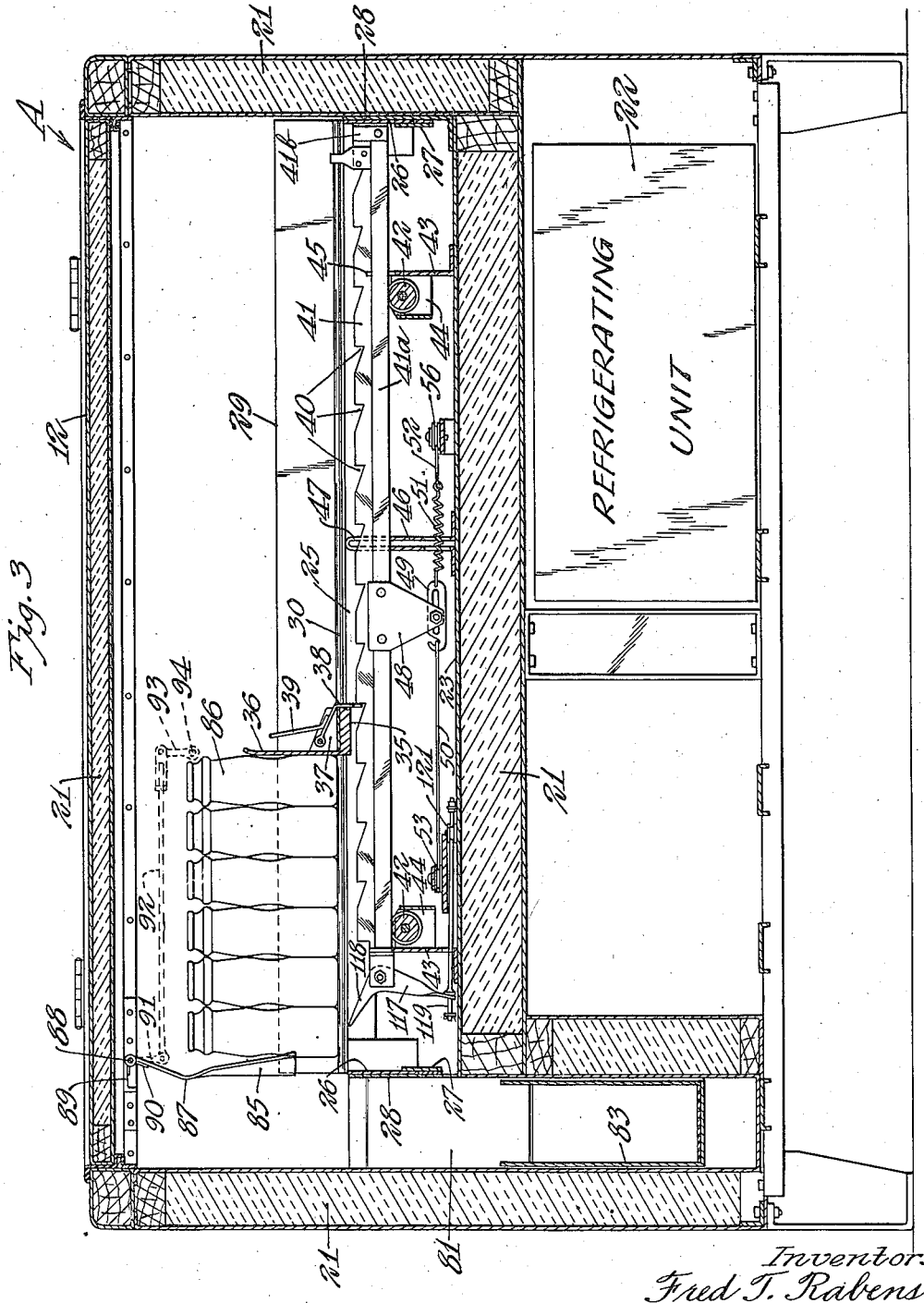
Inventors
Fred T. Rabens
Fredolph T. Peterson
By Williamson + Williamson
Attorneys

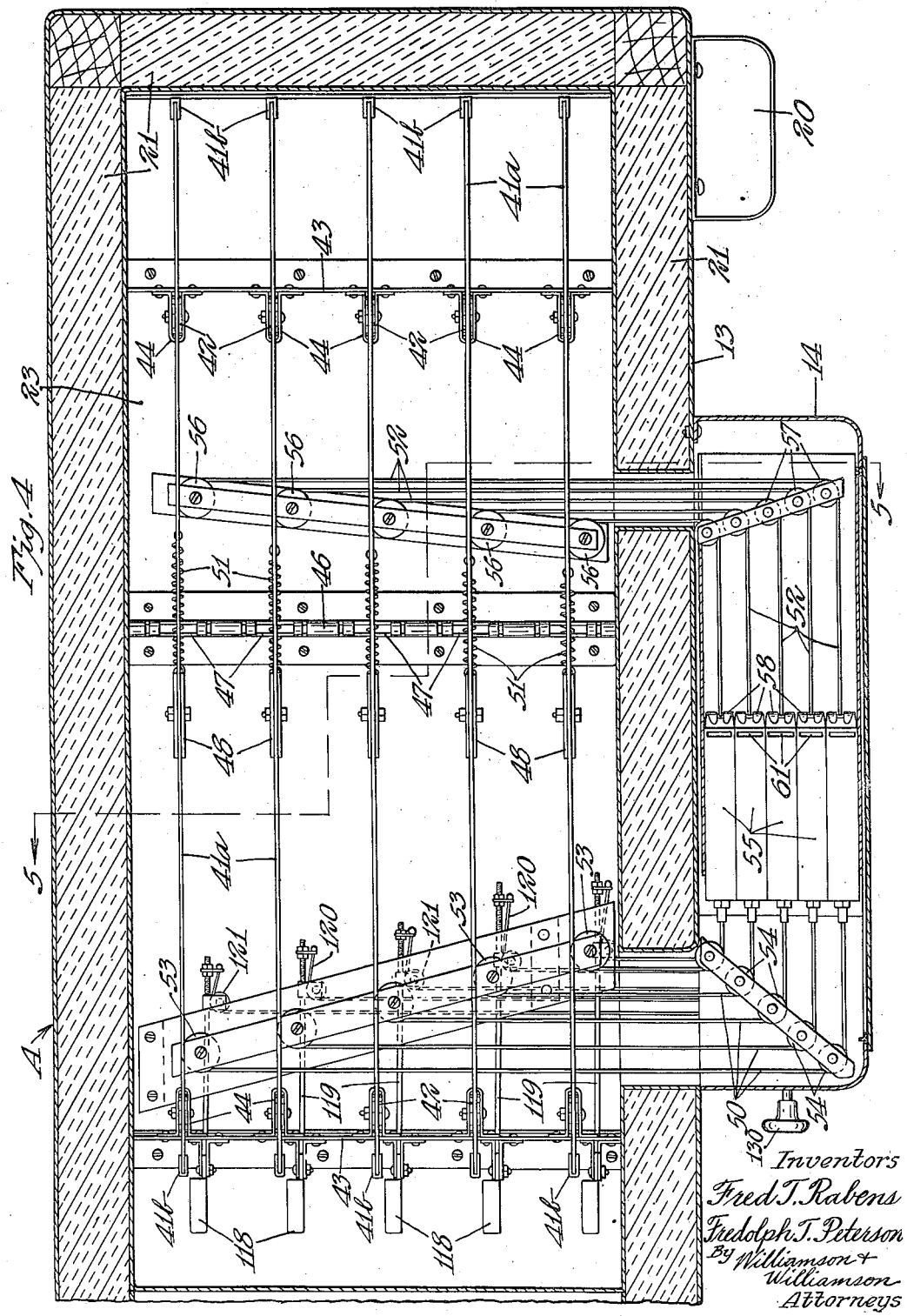

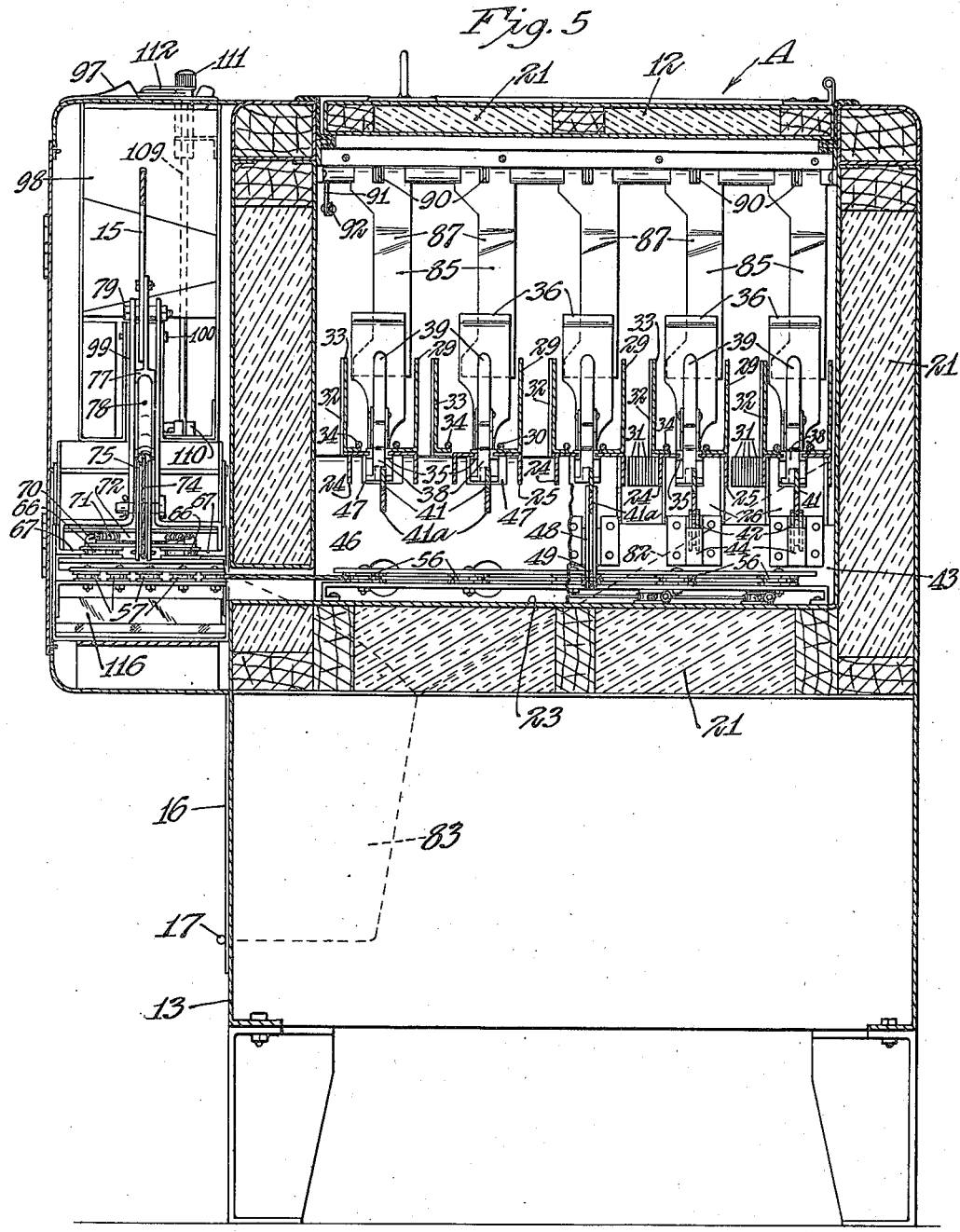

Jan. 15, 1946. F. T. RABENS ET AL 2,393,059
BOTTLED DRINK DISPENSER
Filed April 9, 1943 6 Sheets-Sheet 6
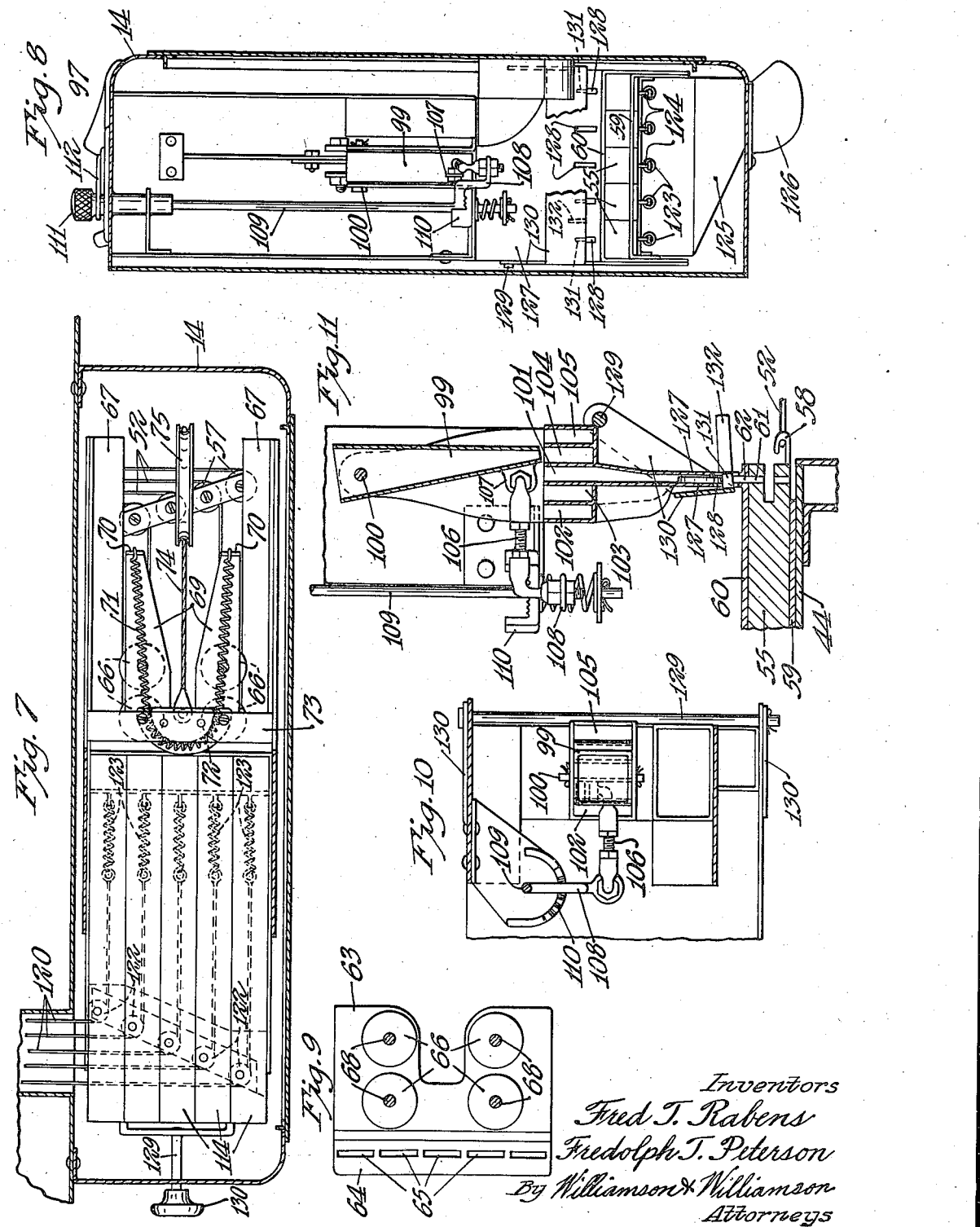
Inventors
Fred T. Rabens
Fredolph T. Peterson
By Williamson & Williamson
Attorneys Patented Jan. 15, 1946

2,393,059

UNITED STATES PATENT OFFICE 2,393,059

BOTTLED DRINK DISPENSER

Fred T. Rabens and Fredolph T. Peterson,
St. Paul, Minn.

Application April 9, 1943, Serial No. 482,406

6 Claims. (Cl. 194—1)

This invention relates to vending machines.

It is a general object of the invention to provide a coin controlled machine for dispensing products such as bottled drinks. It contemplates the provision of a series of magazines for holding different types or quantities of bottled drinks with means for selectively dispensing the different types, and means for quickly and easily adjusting the magazines for different sizes of bottles.

Another object of the invention is to provide a dispensing mechanism having an improved coin actuated mechanism which is comparatively simple in structure and which is arranged to control any one of a number of different bottle holding magazines.

A further object of the invention is to provide means for insuring delivery of the bottled goods to the discharge compartment in proper position so that there is no danger of breakage of the bottled goods or clogging in the machine.

Another object of the invention is to provide hand dispensing means which is controlled that it is impossible for the operator to force the delivery of more than one unit to be purchased for each coin deposited.

These and other objects and advantages of the invention will more fully appear from the following description made in connection with the accompanying drawings, wherein like reference characters refer to the same parts throughout the views, and, in which:

Fig. 1 is a front elevation of the machine;

Fig. 2 is a plan view of the machine with the top of the cabinet open;

Fig. 3 is a longitudinal vertical section through the machine;

Fig. 4 is a horizontal section with portions of the dispensing magazines removed;

Fig. 5 is a section taken approximately on the line 5—5 of Fig. 4 but with the dispensing magazines in position;

Fig. 6 is an enlarged fragmentary view of the coin control and hand operating mechanism;

Fig. 7 is a section taken approximately on the line 7—7 of Fig. 6;

Fig. 8 is a section taken approximately on the line 8—8 of Fig. 6;

Fig. 9 is a plan view of the coin connector carriage;

Fig. 10 is a fragmentary plan view of a portion of the coin chute selecting means; and Fig. 11 is a vertical sectional view through the coin chute selecting means.

In Fig. 1 there is shown a cabinet A having a hinged top 12, a main front face 13 and a control housing 14 mounted on said front face 13. There is also shown a dispenser actuating handle 15 and an outlet door 16 which is mounted on a hinge 17 and is provided with a handle 18. On the right-hand side of the casing front face 13 is a bottle cap remover 19 and a cap receptacle 20.

Within the cabinet A is suitable insulating material 21 and a refrigerating unit indicated at 22. In the insulated portion of the cabinet A is a floor 23 which is provided to support a portion of the dispensing mechanism.

The magazines which hold the bottled goods each have main supporting members 24 and 25 which, as shown in Fig. 3, have downwardly extending end portions 26 which fit into sockets formed by plates 27 which are fixed in plates 28 at each end of the machine. Secured to the support 25 is a vertically disposed magazine side wall 29 having a rounded track element 30 thereon which is adapted to assist in supporting a bottle or other article in the magazine.

Adjacent each of the magazine supports 24 is a series of spaced plates 31 which form spaced pockets or recesses for receiving a downwardly extending lower portion of leg members 32 which are connected to and support the magazine side wall members 33. Said side wall members 33 have rounded track elements 34 thereon similar to the elements 30 on the magazine side wall members 29. It is, therefore, seen that the width of the magazine can be varied at will by shifting the magazine side wall members 33 toward and away from the stationary side wall members 29.

Slidably mounted between magazine supporting members 24 and 25 are blocks 35 which are channeled to receive the edges of said magazine supports 24 and 25. Extending upwardly from each of the blocks 35 is a follower member 36 which is adapted to bear against the last of the line of bottles, as best indicated in Figs. 2 and 3. At the rear of the follower 36 is a pair of vertically disposed webs 37 between which is pivotally mounted a dog 38 having a release handle 39 thereon. The dog 38 is adapted to be received in any one of a number of notches 40 which are formed in removable racks 41. The ends of each rack 41 rest in a socket 41b supported by a bar 41a which rides on a pair of rollers 42 positioned at spaced points in the cabinet A upon the floor 23. The rollers are supported in spaced relation to the floor by means of brackets 43 which carry the roller housing 44. The brackets 43 extend upwardly above the rollers 42 and are provided with notches 45 which assist in keeping the rack 41 in a vertical position. Intermediate the brackets 43 and rollers 42 is a transverse brace 46 which is provided with cut-outs or notches 47 to assist in supporting the rack 41 in a vertical position.

Connected to the rack 41 intermediate its ends are plates 48 which have a link 49 secured therebetween. One end of said link 49 is connected to a cable 50 and the other end of each link 49 is connected to a tension spring 51 which in turn connects with an end of a cable 52. As best shown in Fig. 4, each cable 50 extends around a pulley 53 and thence around a pulley 54 to connect with each of a plurality of sliding coin connector bars 55. Each of the cables 52 extends around a pulley 56 and thence around a pulley 57 to connect with a series of hook-like elements 58 at the opposite ends of the coin connector bars 55 from the ends where the cable 50 connect. Thus when any one of the bars 55 is reciprocated it will similarly reciprocate the respective rack bar 41 to which it is connected by the cables 50 and 52. The spring 51 in the cable system keeps it tight at all times.

The sliding bars 55 rest upon a base plate 59 and have an upper guide plate 60. As viewed in Fig. 6, said bars have coin receiving slots 61 therein. The base plate 59 terminates adjacent the slots 61 and the upper plate 60 is shown with a coin slot 62 therein which coincides with the slots 61 in the bars 55 when said bars are in the position shown in Fig. 6. Adjacent the right-hand end of the bars 55 is a plate 63 which is shown separately in Fig. 9. The plate 63 has an edge portion 64 having a plurality of coin slots 65 therein. Mounted on the plate 63 are four rollers 66 which are adapted to movably support the plate 63 between a pair of spaced parallel track members 67. Connected to the roller axles 68 above the said rollers 66 is a yoke 69 having a pair of upturned ears 70 to which are connected the ends of a tension spring 71. The intermediate portion of the spring 71 extends about a semicircular block 72 which is mounted upon a stationary cross member 73 connected between the track members 67. A cable 74 is connected to the plate 63 at one end and extends around a pulley 75 best shown in Fig. 6, and the opposite end of said cable 74 is connected to an adjustable terminal 76 which is mounted upon a quadrant 77 having a grooved edge 78. Quadrant 77 is mounted upon a pivot 79 and is also connected to the hand lever 15 which extends outside of the casing 14 which holds the coin controlled operating mechanism. The spring 71 is adapted to return the plate 63 to the position shown in Fig. 6 and when the hand lever 15 is pressed down it will cause the cable 74 to pull the plate 63 to the right as viewed in Fig. 6. A suitable dashpot 80 is connected between the top of the casing 14 and the hand lever 15 to retard downward movement of said hand lever 15 so that the mechanism cannot be actuated with a sudden jump.

At the left-hand ends of the trackways 30 and 34 which support the articles to be dispensed is an article receiving well 81 which has a forwardly and downwardly slanting bottom indicated by the dotted line 82 in Fig. 5. The well 81 communicates with a bucket 83 which is mounted in the front wall of the main casing A at the lower left-hand side thereof and which is pivotally supported by the hinge 17 so that it can be swung outwardly from the front wall of the casing A.

At the ends of the trackways 30 and 34 there are provided yieldable gates 85 which are shaped to properly direct the bottles 86 to the well 81. As shown in Fig. 3 the near edges of the gates 85 are bent inwardly toward the bottles, and at a point on each gate adjacent the top of the first bottle in a line said gate is provided with a bend 87 which tends to tilt the top of the bottle to the left as viewed in Fig. 5, and the bent lower portion of each gate 85 will tend to tilt the lower portion of the bottle to the right as viewed in Fig. 5 and cause the lower part of the bottle to feed downwardly into the well 81 and strike the slanting well bottom 82 in a manner which prevents injury to the bottle.

The gates 85 are mounted upon a shaft 88 as shown in Fig. 3, said shaft being supported beneath a plate 89 which extends across a major portion of the interior of the casing A. About the shaft 88 and adjacent each of the gates 85 is a helical spring 90 which has one end bearing against its respective gate 85 and its other end positioned beneath the plate 89. The spring 90 tends to keeep the gates 85 pressed inwardly toward the bottles in the respective magazines.

Additional means is provided to insure proper feeding of the bottles from their magazines and to insure delivery of only one bottle at a time. Connected to the shaft 88 is a lever 91 which is connected to a link 92 extending to a lever 93 on a shaft 94 as indicated in Figs. 3 and 6. The lever 91, link 92 and lever 93 in Fig. 3 is so illustrated in that figure for the reason that those elements lie in front of the structure set forth in Fig. 3 in full lines. The shaft 94 supports a swingable lever 95 having a weight 96 thereon. Should the cabinet be tipped from its right-hand end as viewed in Figs. 1 and 3 in an attempt to dump one or more of the bottles 86 from the machine the weighted lever 95 in Fig. 6 would swing to the left and through levers 91 and 93 and link 92 would cause the shaft 88 to partially rotate in a counterclockwise direction thus depressing the plate 89 which is fastened to the lever 91 and increase the torsion of springs 90 on said shaft 88. This increases the resistance of the gates 85 and retains the bottles in their respective magazines.

The small casing 14 on the front of the main cabinet A houses the coin mechanism by means of which the dispenser is operated. There is a coin inlet 97 which communicates with a chute 98 shown in Fig. 6. The chute 98 in turn communicates with a movable chute section 99 which is pivotally mounted at 100. The pivoted chute section 99 is adapted to communicate with any one of a series of chute sections 101, 102, 103, 104 and 105 which are in turn in respective communication with one of the coin slots 61 in the sliding bars 55. Manipulation of the pivoted coin chute section 99 is accomplished by means of a link 106 connected to a lug 107 which is secured to the pivoted chute section 99, said link being also connected to a crank arm 108 extending from the lower portion of a vertical shaft 109. This is illustrated in Figs. 6, 8, 10 and 11. The crank 108 is adapted to engage a curved rack 110 which has teeth thereon spaced to stop the crank 108 at positions which will align the discharge end of the pivoted coin chute section 99 with the inlet ends of the chute sections 101 through 105. The upper end of the vertical shaft 109 extends to the top of the casing 14 and terminates in a knurled operating knob 111 adjacent the knob 111 is an indicator finger 112 which points to any one of five different positions as shown by the dial 113 on top of the casing 14. This indicates the particular magazine for a particular type or quantity of the product desired by the customer.

When a selection is made and a coin is dropped into the inlet 97 it will fall through the various selected chute sections and into one of the coin slots 61 in a sliding bar 55. The coin will come to rest on one of a series of plates 114 which rest beneath the plate 59 directly respectively underneath the bars 55. With the coin in this position resting upon one of the plates 114 it also extends through one of the slots 65 in the sliding plate 63 which moves upon the rollers 66 between the trackways 67. Thereupon as best illustrated in Fig. 6, when the handle 15 is depressed it will pull the plate 63 and that bar 55 to which it is connected by a coin 115. The plate 63 will pull that bar 55 to which it is connected by a coin for the full limit of its throw and then when the handle is released the grip on the coin 115 between the bar 55 and plate 63 will be loosened and the coin will drop into a coin receiving tray 116. This disconnects the bar 55 and it is pushed back to its position shown in Fig. 6 under tension of the spring 71 which is connected to the yoke 69 and plate 63. Movement of the bar 55 and plate 63 will move the cables 50 and 52 which are connected to one of the toothed racks 41. In turn the rack 41 which has been actuated will move the bottle follower a predetermined step to the left as viewed in Fig. 3 and push the foremost bottle in that particular magazine into the well 81 from whence it will drop into the bottle receiver 83. The bottle receiver 83 is then swung outwardly from the main cabinet A and the bottle removed by hand.

At the end of each trackway or magazine showing a line of bottles is a trigger 117 having a cam surface 118. The lower end of the trigger 117 is connected to a slidable rod 119 which in turn is connected at one end to a cable 120. A trigger 117, rod 119 and cable 120 is provided for each magazine and for each slidable coin connector bar 55. Each cable 120 extends around pulleys 121 shown in Fig. 4 and pulleys 122 shown in Fig. 7. Tension springs 123 connect the ends of the cables 120 with stationary brackets 124. The springs 123 normally and yieldably retain the plates 114 in the positions shown in Fig. 6. When a magazine holding a row of bottles is empty the follower 36 in that magazine will engage and depress the trigger 117 in its magazine. Thereupon the cable 120 will pull one of the slidable plates 114 to the left permitting the coin 115 to drop through the return chute 125 and into a coin delivery receptacle 126 in the front portion of the cabinet A.

Each of the slidable coin releasing plates 114 at its left-hand end is bent over at 114a and around a bar 128 which is connected to a rod 129 extending outside of the casing and terminating in a knob 130 as indicated in Figs. 1 and 6. If a slug or other element is dropped into the coin mechanism and is of such size that it will not properly operate, the knob 130 can be pulled to pull the plates 114 to the left from beneath the coin slots in the bars 55 and ordinarily the slug or other element will drop through to the coin return 126.

The lower ends of the lower coin chute sections 101 through 105 are defined by a pair of spaced plates 127 which are adapted to register the coins with the several slots 61 in the sliding bars 55. Pivotally connected at opposite sides of the assembly of chute sections 101 through 105 on pivots 129 is a swinging gate 130 which normally tends to swing downwardly against the left-hand plate 127 as shown in Figs. 6 and 11. The plates 127 are provided with a plurality of slots 128 therethrough, and the gate 130 has a plurality of lugs 131 extending outwardly from the lower edge thereof. These lugs 131 are so positioned that when the gate swings downwardly and against the left-hand coin guide plate 127 said lugs will pass through the slots 128 in both plates 127 to prevent coins from dropping into the slots 61 of the sliding bars 55. However, when the yoke 69 is in its nearest position to the left as shown in Fig. 6 said yoke engages an arm 132 which extends outwardly from the gate 130 and swings said gate from the position shown in Fig. 11 to the position of Fig. 6, thus moving the coin obstructing lugs 131 out of the slots 128 in the plates 127 so that coins will drop freely into the slots 61 in the slide bars 55. The gate 130 is provided to prevent coins from dropping out of the lower portions of the coin chutes 101 through 105 after the operating lever 15 has been pressed downwardly a slight distance to move the yoke 69 toward the right in a dispensing operation. If a coin is dropped in the dispensing mechanism after the lever 15 has been pressed down it will be retained by one of the lugs 131 on the gate 130 until the dispensing operation has been completed and the yoke 69 has returned its full distance to the left as viewed in Fig. 6, whereupon the gate 130 is opened by the yoke and the coin is permitted to drop through into one of the slots 61 in the bars 55.

The machine is one which is particularly adaptable for dispensing milk and other bottled goods since it is simple and efficient in operation and its bottle supporting trackways can be readily removed and cleaned. Furthermore, the trackways made up of the members 29 and 33 are adjustable in width so the different sizes of bottles can be dispensed from the apparatus. The device can readily be filled and the bottles will feed from the machine with the greatest degree of safety against breakage as well as be insured against unauthorized removal without proper payment. It is a self-contained refrigerated unit which will hold a considerable amount of stock and requires infrequent attention from an attendant. Not only are the trackways adjustable in width but the toothed racks extending along said trackways are quickly interchangeable so that the movement of the follower can be readily adjusted to different widths of bottles within a reasonable range. The trigger mechanism insures return of the coin if a magazine has been previously emptied. One important feature of the device is a positive return of the racks 41 by reason of the cables 50 which are connected between the racks and the sliding connector bars 55. Furthermore, the dashpot 80 connected to the operating handle 15 prevents the operator from pushing the handle down too suddenly in an attempt to force more than one bottle past one of the gates 85.

While we have shown one form of the invention, it will, of course, be understood that various changes may be made in the form, arrangement, details and proportions of the various parts throughout the views, without departing from the scope of our invention.

What is claimed is:

1. In a vending machine, a substantially horizontal trackway to slidably receive a plurality of objects to be dispensed, a follower movable along said trackway, a rack mounted for reciprocating movement adjacent said trackway and in alignment therewith, the mounting for said rack including means for removably receiving said rack, means for actuating said rack mounting, and a connection between said follower and said rack.

2. In a vending machine, a magazine having a dispensing opening associated therewith, a follower in said magazine, a yieldable gate at an end of said magazine adjacent said outlet, and said gate being shaped to tilt an article being pushed therefrom by said follower and present an end of the article to said dispensing outlet.

3. In a vending machine, a plurality of magazines, each including a trackway, a follower movable along each of said trackways with a step-by-step motion, adjustable coin controlled mechanism for selectively actuating said followers and having a single actuator, coin return mechanism, and an independently operable trip device for each magazine for actuating said coin return mechanism, said trip devices lying in the path of movement of said followers and presenting slanting cam-like faces to said follower.

4. In a vending machine, a magazine, a follower in said magazine, an actuator handle, reciprocating means engageable with said follower to move said follower in a step-by-step manner, cables connected between said actuator handle and said reciprocating means to positively move said reciprocating means in both directions, and a take-up spring in one of said cables to maintain said cables under tension and eliminate play therein.

5. In a vending machine, a substantially horizontal trackway to slidably receive a plurality of objects to be dispensed, a follower movable along said trackway with a step-by-step movement, a gate at the dispensing end of said trackway, said gate being pivoted and under tension to yieldably swing aside as articles are being dispensed, and means connected to said gate for increasing the tension thereon when said trackway is tilted downwardly and forwardly.

6. The structure in claim 5, and said means for increasing the tension on said gate comprising a weighted lever connected to said gate.

FRED T. RABENS.
FREDOLPH T. PETERSON.